(12) United States Patent
Rich et al.

(10) Patent No.: US 8,724,817 B2
(45) Date of Patent: *May 13, 2014

(54) SECURE MANAGEMENT OF KEYS IN A KEY REPOSITORY

(75) Inventors: Bruce A. Rich, Cedar Park, TX (US); Thomas H. Benjamin, Cedar Park, TX (US); John T. Peck, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 180 days.

This patent is subject to a terminal disclaimer.

(21) Appl. No.: 13/459,675

(22) Filed: Apr. 30, 2012

(65) Prior Publication Data

US 2012/0213369 A1 Aug. 23, 2012

Related U.S. Application Data

(63) Continuation of application No. 12/984,869, filed on Jan. 5, 2011.

(51) Int. Cl.
| | | |
|---|---|---|
| *H04L 9/08* | (2006.01) | |
| *G06F 12/14* | (2006.01) | |
| *G06F 21/86* | (2013.01) | |
| *G06F 12/08* | (2006.01) | |

(52) U.S. Cl.
CPC *H04L 9/08* (2013.01); *H04L 9/083* (2013.01); *G06F 21/86* (2013.01); *G06F 12/0866* (2013.01)
USPC ........... 380/277; 380/278; 380/279; 713/193; 713/194; 711/113; 711/135; 711/161; 711/162

(58) Field of Classification Search
USPC ........... 380/277–279; 713/189–194; 711/113, 711/135, 143, 161, 162
See application file for complete search history.

(56) References Cited

U.S. PATENT DOCUMENTS

| | | |
|---|---|---|
| 5,363,447 A | 11/1994 | Rager et al. |
| 5,414,861 A | 5/1995 | Horning |
| 5,566,315 A | 10/1996 | Milillo et al. |
| 5,905,854 A | 5/1999 | Nielson et al. |
| 6,272,587 B1 | 8/2001 | Irons |
| 6,282,711 B1 | 8/2001 | Halpern et al. |
| 6,587,933 B2 | 7/2003 | Crockett et al. |
| 6,839,437 B1 | 1/2005 | Crane et al. |
| 6,934,840 B2 | 8/2005 | Rich et al. |
| 7,010,645 B2 | 3/2006 | Hetzler et al. |
| 7,203,802 B2 | 4/2007 | Huras et al. |
| 7,395,389 B2 | 7/2008 | Kaplan et al. |
| 7,783,046 B1 | 8/2010 | Sklyarov et al. |
| 7,823,190 B1 | 10/2010 | Kacarov et al. |

(Continued)

OTHER PUBLICATIONS

Saggese et al, "Hardware Support for High Performance Instrusion- and Fault-Tolerant Systems", Proceedings of the 23rd IEEE International Symposium, 195-204, 2004, IEEE Comput. Soc., Los Alamitos, California, US.

(Continued)

*Primary Examiner* — Catherine Thiaw
(74) *Attorney, Agent, or Firm* — Paul S. Drake

(57) ABSTRACT

A method for managing keys in a computer memory including receiving a request to store a first key to a first key repository, storing the first key to a second key repository in response to the request, and storing the first key from the second key repository to the first key repository within said computer memory based on a predetermined periodicity.

12 Claims, 7 Drawing Sheets

(56) References Cited

U.S. PATENT DOCUMENTS

| | | | |
|---|---|---|---|
| 8,117,464 B1 | 2/2012 | Kogelnik | |
| 8,190,822 B2 | 5/2012 | Iida et al. | |
| 8,190,921 B1 | 5/2012 | Harwood et al. | |
| 8,213,620 B1 | 7/2012 | Sussland et al. | |
| 2003/0140238 A1 | 7/2003 | Turkboylari | |
| 2003/0145176 A1 | 7/2003 | Dvir et al. | |
| 2006/0080515 A1 | 4/2006 | Spiers et al. | |
| 2008/0016295 A1 | 1/2008 | Yim et al. | |
| 2008/0072070 A1 | 3/2008 | LaMacchia et al. | |
| 2008/0285372 A1 | 11/2008 | Sohn et al. | |
| 2009/0052670 A1 | 2/2009 | You et al. | |
| 2009/0060197 A1 | 3/2009 | Taylor et al. | |
| 2009/0067633 A1 | 3/2009 | Dawson et al. | |
| 2009/0150599 A1 | 6/2009 | Bennett | |
| 2010/0125855 A1 | 5/2010 | Ferwerda et al. | |
| 2010/0199021 A1 | 8/2010 | Harper et al. | |
| 2010/0205358 A1 | 8/2010 | Ishibashi | |
| 2010/0205367 A1 | 8/2010 | Ehrlich et al. | |
| 2010/0205470 A1 | 8/2010 | Moshayedi et al. | |
| 2010/0274962 A1 | 10/2010 | Mosek et al. | |
| 2010/0290624 A1 | 11/2010 | Buer et al. | |
| 2010/0306448 A1 | 12/2010 | Chen et al. | |
| 2010/0306635 A1 | 12/2010 | Tang et al. | |
| 2011/0022790 A1 | 1/2011 | Fachan et al. | |
| 2011/0087898 A1 | 4/2011 | Williams | |
| 2011/0161597 A1 | 6/2011 | Tremaine et al. | |
| 2011/0173372 A1 | 7/2011 | Schuette | |
| 2012/0004011 A1 | 1/2012 | Chun | |
| 2012/0017097 A1 | 1/2012 | Walrath | |

OTHER PUBLICATIONS

Horsky, "V6R1—Storage Directions", IBM Power Systems, 2008, IBM Corp., US.

"Developer's Setup Guide—VMware Infrastructure SDK 2.5", 2007, VMware Inc., US.

"Lesson: API and Tools Use for Secure Code and File Exchanges", published on the World Wide Web at http://download.oracle.com/javase/tutorial/security/sigcert/index.html, 1995, 2010, Oracle Corp.

Nadalin et al, "Unshackling Key Management in Java Security", published on the World Wide Web at http://www.ibm.com/developerworks/ibm/library/it-keyjava.html, Nov. 1, 2001, IBM Corp.

Benantar et al, "IBM WebSphere Developer technical Journal: Using the Java Secure Socket Extension in WebSphere Application Server", published on the World Wide Web at http://www.ibm.com/developerworks/websphere/techjournal/0502_benantar/0502_benantar.html, Feb. 23, 2005, IBM Corp.

SECURE MANAGEMENT OF KEYS IN A KEY REPOSITORY

This application is a continuation of application Ser. No. 12/984,869 filed Jan. 5, 2011 entitled "SECURE MANAGEMENT OF KEYS IN A KEY REPOSITORY", the disclosure of which is incorporated in its entirety herein by reference.

BACKGROUND

1. Technical Field

The present invention relates generally to improved method of managing digital keys used in cryptographic operations, and in particular, to a computer implemented method for securely managing these keys in a key repository.

2. Description of Related Art

The Internet is a global system of interconnected computer networks that use standards based protocols to serve a variety of content to billions of users worldwide. The World Wide Web, or Web, is one of the services communicated via the Internet. The Web is a collection of interconnected web sites, linked by links, which include Uniform Resource Identifiers ("URIs"). URIs are classified as Uniform Resource Locators ("URLs"), as Uniform Resource Names ("URNs"), or both. A URL resembles a person's street address while a URN functions like a person's name.

A URL has a syntax and includes the protocol used to transfer data (e.g., http:, https: or ftp:), a server name and domain name used to identify the address of the server containing a webpage, a directory and subdirectory on the server, and filename and file type of the content delivery unit. The form used for these URL addresses is protocol://servername.domainname/directory/subdirectory/fil ename.filetype. The websites located at the address identified by a URL may be a web page, image, video, or other type of content. A web browser is used to retrieve, present, and traverse the websites on the Web.

The Web has become a pathway for spreading malware and carrying out cybercrime such as identity theft, fraud, espionage and intelligence gathering. Websites on the Web are frequent sources of infection of personal computers by malware, spyware, worms, viruses, and other unwanted and/or dangerous programs. Because of the malware and cybercrime on the Web, many websites contain security features to attempt to prevent or reduce the risk of infection and criminal activity.

In response to this threat, secure methods of communication between a web browser and a website have been created such as the SSL secure socket layer and the HTTPS security protocol. However, such secure protocols are not secure unless both the web browser and the website can verify that the other is authentic and that the communication is secure from eavesdropping. Various measures have been developed to provide this security including a public key infrastructure and the use of private keys. A key may a digital alphanumeric value, often generated from prime numbers for use in secure cryptographic based network or internet communications, and may be either public or private in nature. Keys may be generated or used in pairs, either symmetrically or asymmetrically. Keys may be contained within a digital certificate or other type of certificate generated by a user and/or third party approver. A public key infrastructure has been developed by the web community to create, manage, distribute, use, store and revoke digital certificates. These digital certificates include information about a person or organization, a unique public key for that person or organization, and a digital signature from a third party certificate authority verifying the identity of that person or organization. In addition, a web browser user and a website may have private keys used for encrypting the communication between them. Internet standards such as transport layer security (TLS) utilize private keys to provide secure encrypted communications between web browsers and websites.

The various types of keys (e.g., public keys, private keys, digital certificates each containing a key, etc.) are typically stored by a web browser or a website in a repository in memory. However, this type of information needs to be stored securely to prevent third parties such as hackers from accessing that information. Often such a key repository contains multiple keys (including certificates containing keys) that are encrypted and hashed and stored in a secure or hidden location memory for future use. The encryption prevents hackers from using any private information read from the key repository in memory, and the hash helps verify that the key repository has not been modified by unauthorized personnel or otherwise tampered with in any manner.

There are various formats of key repositories used today. When running in Java™ (a machine independent software language) security certificates can be stored in a key repository called a keystore (Java is a trademark of Oracle Corporation in the United States and other countries). Java™ uses a keystore format called JKS that does not require real cryptographic services, a keystore format called PKCS-12 with cryptographic schemes to encrypt sensitive data, and a keystore format called JCEKS that uses a password based encryption scheme. A user may use multiple keystores or other types of key repositories with the same format or with different formats. For example, a user may store all certificates and/or public keys in one keystore such as JKS and private keys in a different more secure format such as JCEKS.

Some large organizations use a Tivoli Key Lifecycle Manager (TKLM) for managing keys and certificates across the many users of the organization. TKLM may utilize JKS and/or JCEKS keystores to securely store keys as well as the certificates containing keys.

SUMMARY

The illustrative embodiments provide a method for managing keys in a computer memory including receiving a request to store a first key to a first key repository, storing the first key to a second key repository in response to the request, and storing the first key from the second key repository to the first key repository in a computer memory based on a predetermined periodicity.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Figure 1:
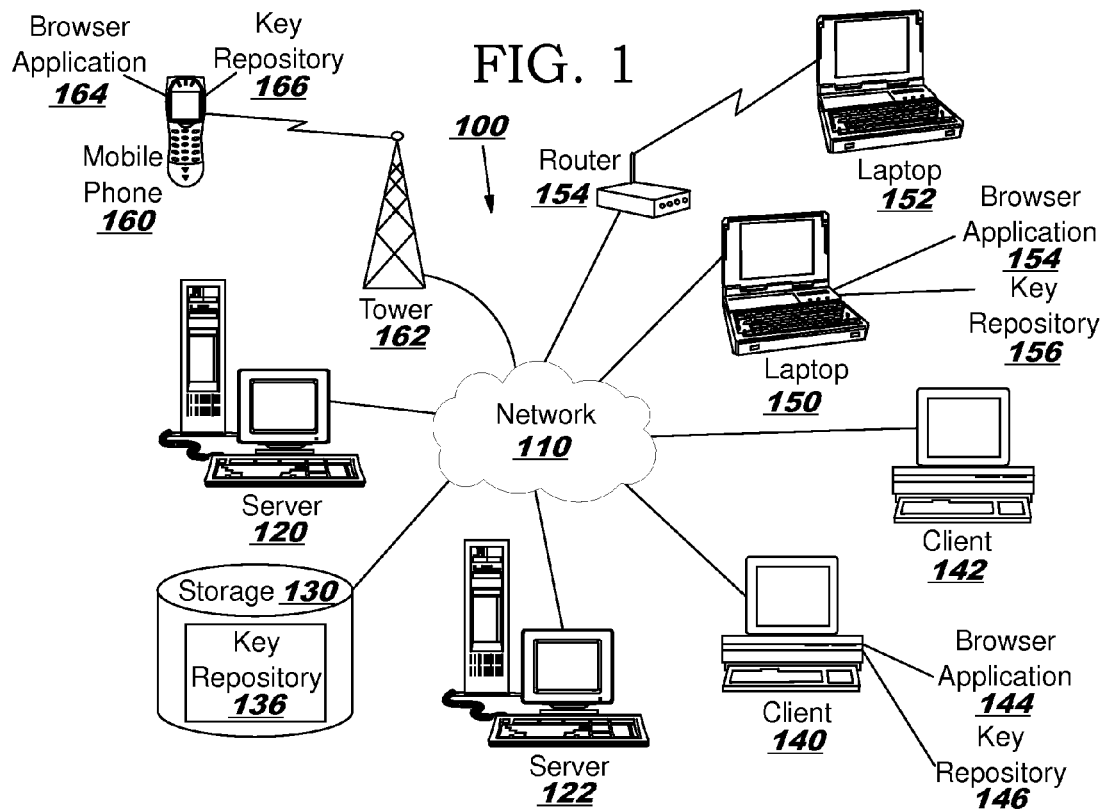
FIG. 1 depicts a pictorial representation of a network of data processing systems in which various embodiments may be implemented.

FIG. 1 depicts a pictorial representation of a network of data processing systems in which various embodiments may be implemented. Data processing environment 100 is a network of data processing systems also known as computers in which the embodiments may be implemented. Software applications may execute on any computer or other type of data processing system in data processing environment 100. Data processing environment 100 includes network 110. Network 110 is the medium used to provide communications links between various devices and computers connected together within data processing environment 100. Network 110 may include connections such as wire, wireless communication links, or fiber optic cables.

Servers 120 and 122 and clients 140 and 142 are coupled to network 110 along with storage unit 130. In addition, laptops 150 and 152 are coupled to network 110 including wirelessly through a network router 154. A mobile phone 160 is also coupled to network 110 through a mobile phone tower 162. Data processing systems, such as server 120 and 122, client 140 and 142, laptops 150 and 152, and mobile phone 160, may contain data and may have software applications or software tools executing thereon. Other types of data processing systems such as personal digital assistants (PDAs), tablets and netbooks may be coupled to network 110.

Storage 130 may include key repository 136 for storing keys in accordance with embodiments described herein. Client 140 may include browser application 144 and key repository 146. Laptop 150 and mobile phone 160 may also include browser applications 154 and 164 and key repositories 156 and 166. Other types of data processing systems coupled to network 110 may also include browser applications and key repositories. Browser applications could include a web browser, email, or other software application that can process or execute a content delivery unit such as a web page, email, or other type of information to be processed.

Servers 120 and 122, storage unit 130, clients 140 and 142, laptops 150 and 152, and mobile phone 160 and other data processing devices may couple to network 102 using wired connections, wireless communication protocols, or other suitable data connectivity. Clients 140 and 142 may be, for example, personal computers or network computers.

In the depicted example, server 120 may provide data, such as boot files, operating system images, and applications to clients 140 and 142 and laptop 150. Clients 140 and 142 and laptop 150 may be clients to server 120 in this example. Clients 140 and 142, laptops 150 and 152, mobile phone 160, or some combination thereof, may include their own data, boot files, operating system images, and applications. Data processing environment 100 may include additional servers, clients, and other devices that are not shown.

In the depicted example, data processing environment 100 may be the Internet. Network 110 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 2:
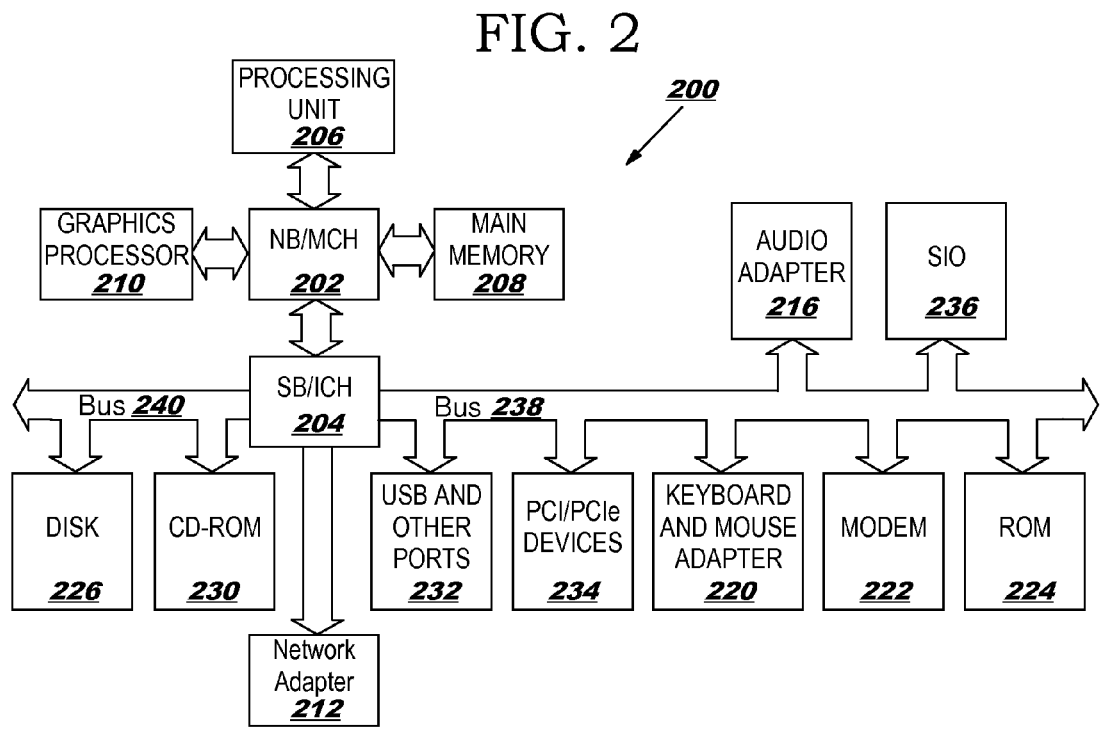
FIG. 2 depicts a block diagram of a data processing system in which various embodiments may be implemented.

FIG. 2 depicts a block diagram of a data processing system in which various embodiments may be implemented. Data processing system 200 is an example of a computer, such as server 120, client 140, laptop 150 or mobile phone 160 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations. In some configurations, processing unit 206 may include NB/MCH 202 or parts thereof.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). In some configurations, ROM 224 may be an Electrically Erasable Programmable Read-Only Memory (EEPROM) or any other similarly usable device. Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200.

Instructions for the operating system, the object-oriented programming system, and applications or programs are located on storage devices, such as hard disk drive 226 or other type on non-volatile memory, and may be loaded into main memory 208 for execution by processing unit 206. The processes of the embodiments may be performed by processing unit 206 using computer implemented instructions, which may be located in a memory, such as, for example, main memory 208, read only memory 224, or in one or more peripheral devices such as hard disk 206. Processing unit 206 may utilize a memory management technique called virtual memory. That is, instructions and data utilized by processor 206 may be virtualized such that the data and instructions appear to be located in a large range of contiguous addresses, yet the data and instructions are actually located in various locations in main memory and secondary memory. Virtual memory may be managed by NB/MCH 202.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the embodiments may be applied to a multiprocessor data processing system.

In some illustrative examples, data processing system 200 may be a mobile phone 160, PDA, netbook or other type of data processing system which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
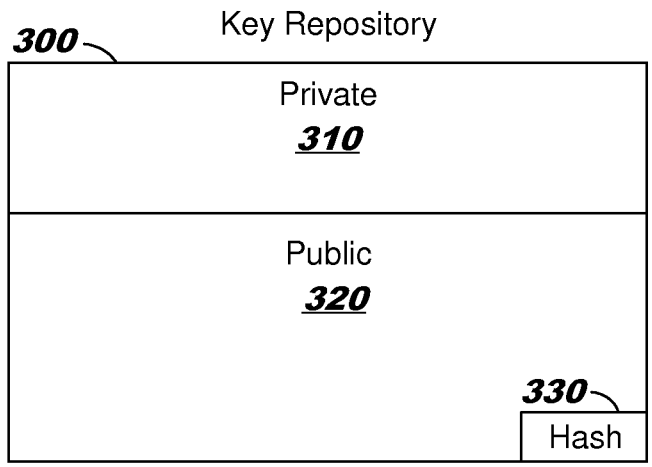
FIG. 3 depicts a block diagram of a key repository in memory in which various embodiments may be implemented.

FIG. 3 depicts a block diagram of a key repository in memory in which various embodiments may be implemented. A key repository may be used for the collective storage of keys in memory for ease of access as well as the secure storage of keys to prevent access or modification of those keys by unauthorized parties or processes. The key repository 300 may have three sections used for different types of keys, certificates and other data. Private section 310 may be used to store private keys that are highly confidential and need to be securely protected. As a result, this section may be encrypted and/or password protected in secondary memory. This section may be the only section encrypted due to the extra processing required for such encryption. If the key repository is in virtual memory, then it may not need to be encrypted. Public section 320 may be used to store public keys and/or certificates containing public keys. Hash 330 may contain a hash of private section 310 and public section 320 in secondary memory. In an alternative embodiment, the hash may be of the private section 310 only. The hash is used to help determine if the private keys, public keys, certificates or other data were modified or tampered with since they were stored in key repository 300 with hash 330. If the key repository is in virtual memory, then it may not need to be hashed in this manner, although hash table or various indexing schemes may be used to allow faster lookup. An alternative embodiment of key repository 300 may not contain a public section 320 or a hash 330 or may organize the various keys and data differently. Another alternative embodiment may contain all public and private keys together without distinguishing between the types of keys and/or other data such as certificates.

If the key repository is in secondary memory, then it may be accessed using a password and key repository name. If the key repository is in virtual memory, then it may be accessed using an alias or other tag of a key being accessed. Alternative embodiments may use other types of key and key repository accessing mechanisms.

Figure 4:
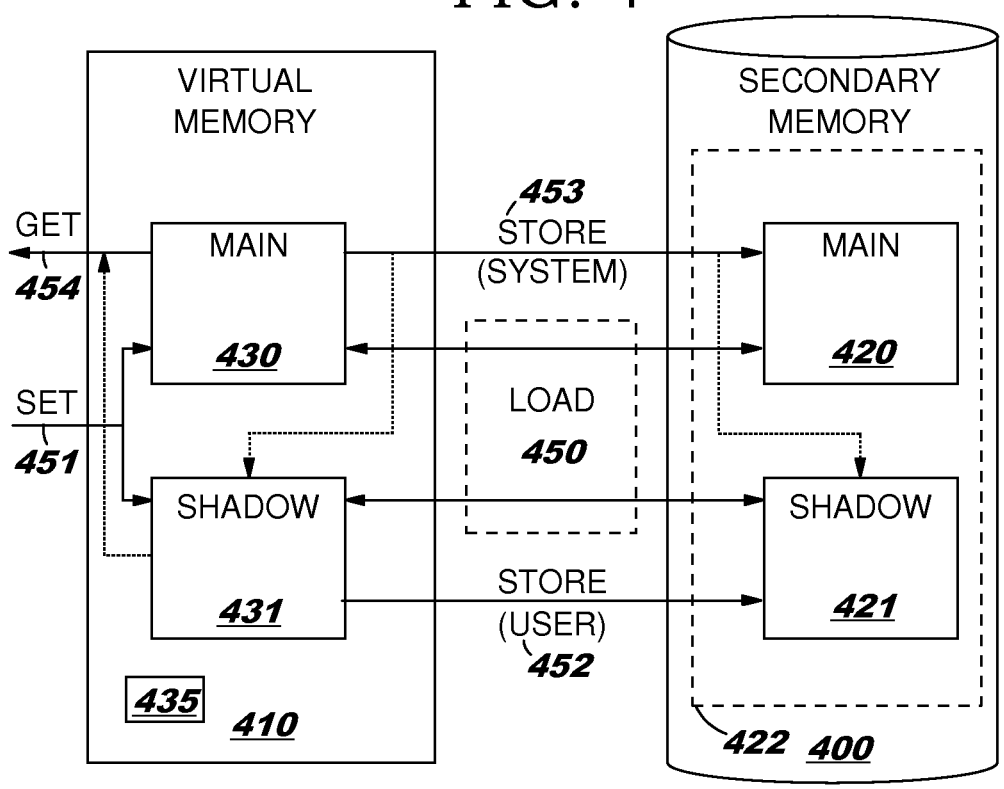
FIG. 4 depicts a block diagram of key repositories being managed in memory in accordance with a preferred embodiment.

FIG. 4 depicts a block diagram of key repositories being managed in memory in accordance with a preferred embodiment. This block diagram is shown implemented within a Java™ environment for this preferred embodiment, although alternative environments and embodiments may be utilized as well. In this preferred embodiment, there are key repositories (called keystores in this environment) stored within secondary storage 400 and virtual memory 410 collectively referred to as computer memory. Secondary storage 400 may be a disk drive, a solid state device (SSD) or other non-volatile memory contained in or coupled to a server 120, client 140, laptop 150, mobile phone 160, or other type of data processing system. Secondary storage allows a key repository to be saved even when a system utilizing that key repository has been turned off or disconnected. Virtual memory 410 may be located in the random access memory or other rapidly accessed memory (typically volatile memory) of a data processing system.

Secondary storage 400 may include a main key repository 420 and a shadow key repository 421. These key repositories may be organized as shown in key repository 300 in FIG. 3. These key repositories may be accessed using a password and a key repository name. The password is to help prevent unauthorized access to the key repositories. The password may be initially set to a standard password which may then be changed by a user or administrator. The key repository name is used in case of multiple main key repositories and/or multiple shadow key repositories. Shadow key repository 421 may be located in a common directory 422 or other area within secondary storage 400 as main key repository 420 to afford the shadow key repository the same security protection as the main key repository. The shadow key repository 421 may use the same password as main key repository 420 to make it easier to manage and administer both key repositories.

Virtual memory 410 may include a main key repository 430 and a shadow key repository 431. These two key repositories may be accessed using an alias for each key or key family (e.g., a private key corresponding to a certificate and public key). Key repositories stored in virtual memory may not be password protected, encrypted, or hashed for security purposes, thereby allowing for rapid access of keys as needed for rapid processing. Virtual memory 410 may also contain an update counter 435 for tracking the number of updates to shadow key repository 431. This could be useful if the number of updates to shadow key repository 431 is the criterion used to update main key repository 420 in secondary memory 400.

Although this embodiment is shown with a single shadow key repository for a main key repository, other embodiments could utilize multiple shadow key repositories for each main key repository, including nested shadow key repositories such as a shadow key repository of a shadow key repository or a main key repository.

Main key repository 430 and shadow key repository 431 are related to main key repository 420 and shadow key repository 421 as will be explained in FIGS. 5 through 8 below. Several instructions are shown in this figure as directing the flow of data between the various key repositories. Those instructions are LOAD 450, SET 451, STORE (user) 452, STORE (system) 453 and GET 454 in the Java™ environment and are described with reference to FIGS. 5 through 9 below.

Figure 5:
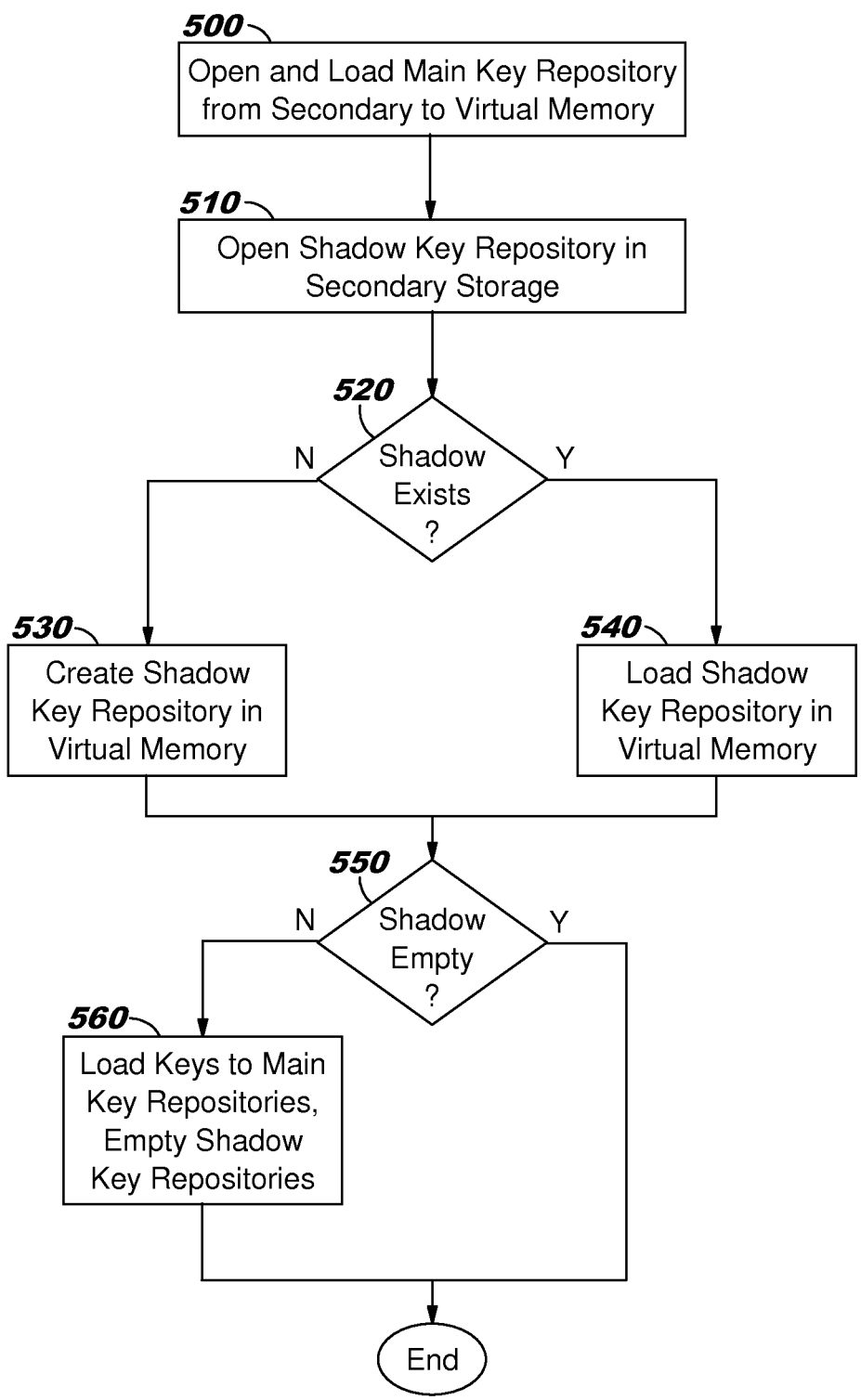
FIG. 5 depicts a flowchart for loading key repositories from secondary memory to virtual memory in accordance with the preferred embodiment.

FIG. 5 depicts a flowchart for loading key repositories from secondary memory to virtual memory in accordance with the preferred embodiment. This may be performed with a LOAD instruction 450. This process may be initiated when a data processing system is booted, when a browser in started, or when a user first needs to obtain information from a key repository during a session.

In a first step 500, the main key repository 420 in key repository memory 400 may be opened with a key repository name and password. Key repository 420 may then be decrypted and loaded from secondary memory 400 to virtual memory 410 including loading aliases for each key or key family, thereby creating main key repository 430. Main key repository 420 may not be modified at this time.

In a second step 510, the shadow key repository 421 in secondary storage may be opened with a key repository name and password. The main key repository 420 and shadow key repository 421 may share the same password.

In step 520, if a signal is received indicating that there is no shadow key repository 421 in secondary memory 400, then in step 530 a shadow key repository 431 is created in virtual memory 410. Otherwise, in step 540, the shadow key repository 421 may be loaded, in a process similar to the process for the main key repository described above, from secondary memory 400 to virtual memory 410 as shadow key repository 431.

In step 550, the system may then determine if there are any keys in shadow key repository 431. If so, then in step 560 the keys are loaded to main key repositories 420 and 430 and then shadow key repositories 421 and 431 are emptied. This process is to handle any issues created by a previous sudden shutdown of the data processing system or other similar occurrences.

Figure 6:
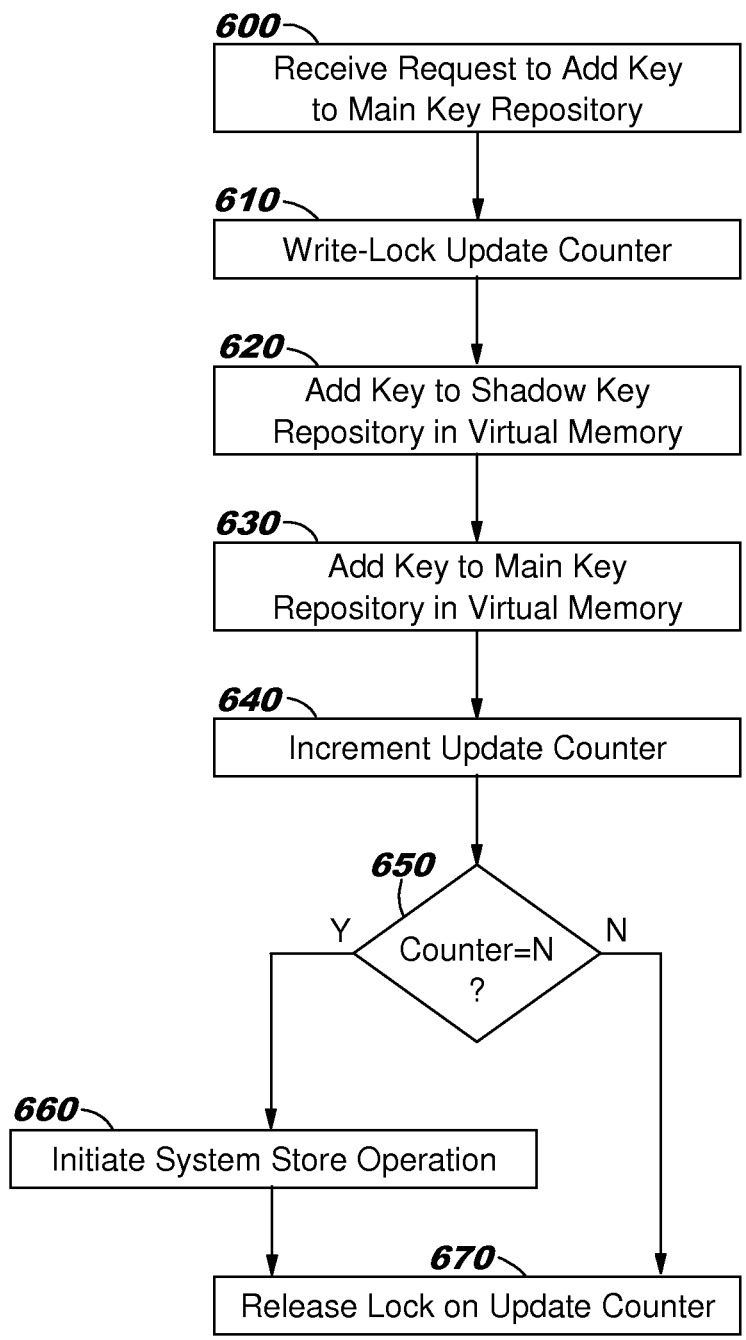
FIG. 6 depicts a flowchart for adding or setting a new key and/or certificate in accordance with the preferred embodiment.

FIG. 6 depicts a flowchart for adding or setting a new key and/or certificate to memory in accordance with the preferred embodiment. This may be performed with a SET instruction 451. In a first step 600, a request may be received from a user (or other user approved source) to add or set a key in the main key repository. Each key should have an alias or name distinct from any other key to avoid conflict issues. In step 610, update counter 435 may be write-locked to prevent concurrent updates by other threads or other concurrent processes. This may be an optional step and may not be applicable if the update counter is not counting the number of updates to the key repository. For example, if the criterion for a system STORE is a predetermined time since the previous system STORE, then this step may not be applicable. In step 620, the key may be added to shadow key repository 431 in virtual memory 410 using the alias supplied by the user in step 600. To a user, the shadow key is invisible, so this step may be invisible to the user. In step 630, the key may then be added to main key repository 430 in virtual memory 410 using the alias supplied by the user in step 600. This step 630 may also be optional if the key is already stored in shadow key repository 431 in step 620. However, if the key is not added to the main key repository 430 in step 620, additional steps need to be taken in the system STORE process explained below with reference to FIG. 8.

In step 640, update counter 435 may be incremented depending on the criterion for a system STORE. That is, if the update counter is counting the number of updates rather than time or other criterion, then it may be incremented. In step 650, if update counter 435 is equal to N where N is a predetermined number of updates to the key repository, then processing may continue to step 660, otherwise processing may continue to step 670. In step 660, a system STORE command may be initiated in a separate thread. In step 670, the update counter write lock may be released so other key repository updates may continue.

Figure 7:
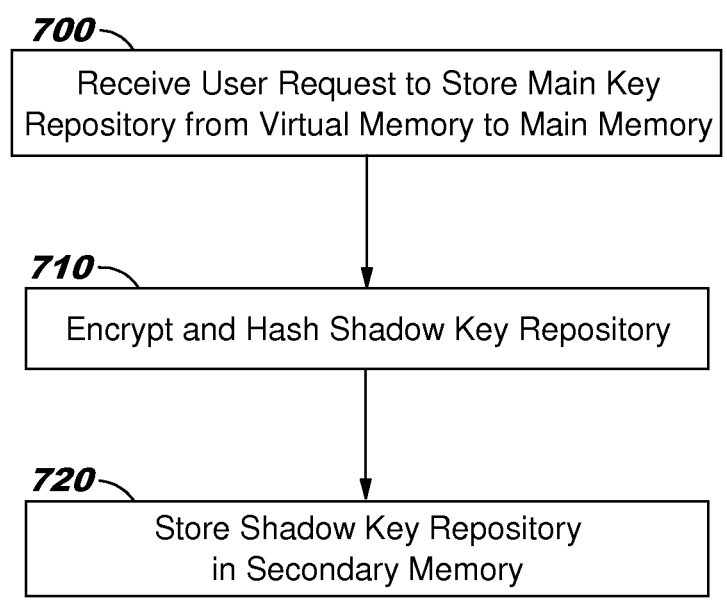
FIG. 7 depicts a flowchart for storing a key repository from virtual memory to secondary memory as requested by a user in accordance with the preferred embodiment.

FIG. 7 depicts a flowchart for storing a key repository from virtual memory to secondary memory as requested by a user in accordance with the preferred embodiment. This may be performed with a STORE (user) instruction 452. This user based STORE command could be combined with the SET combine described above in alternative embodiments. In a first step 700, a request is received from a user (or other user approved source) to store the main key repository from virtual memory 410 to secondary memory 400. In step 710, the data in shadow key repository 431 or portions thereof may be encrypted and a hash created from the encrypted and unencrypted data. In step 720, the encrypted and hashed data may be stored to secondary memory 400 as shadow key repository 421. Shadow key repository 431 may be unmodified by this process. Main key repository 430 may not be copied from virtual memory 410 to secondary memory 400 into main key repository 420 as requested by the user at this time. That function is handled in a system generated STORE command later as explained below with reference to FIG. 8.

There are various advantages to only storing the shadow key repository to secondary memory upon a user request in accordance with this embodiment. For example, if the main key repository is very large due to the storage of many keys, then the use of a shadow key repository would reduce the time to store each new key. The periodic system storing of the main key repository in virtual memory to the main key repository in secondary memory could then be performed in the background, largely invisible to a user, as will be explained with reference to FIG. 8. For another example, if this embodiment were implemented in a device such as a PDA or tablet with a solid state drive, then the use of a shadow key repository could reduce the number of writes to the solid state drive, thereby extending the lifetime of that solid state drive. There are additional advantages if new keys are added only to the shadow key repository during a SET operation. The amount of processing and time to add a key would be reduced. However, additional processing and time and processing would be needed when doing a system STORE described below.

Figure 8:
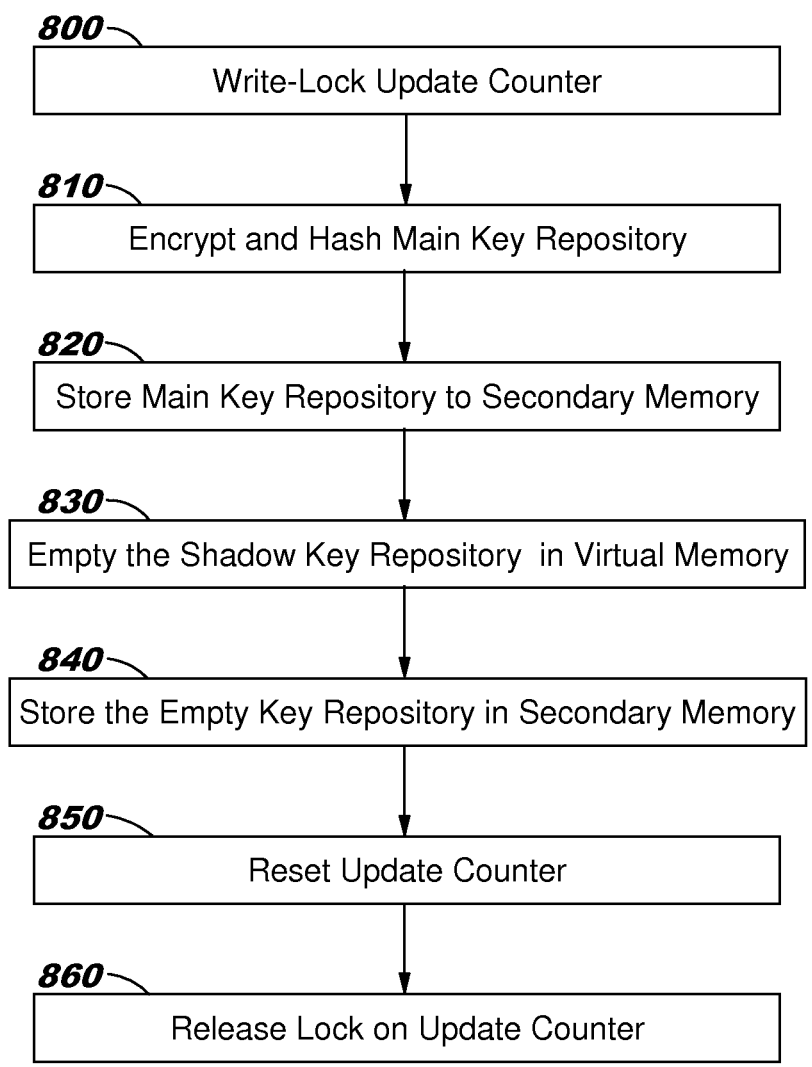
FIG. 8 depicts a flowchart for storing a key repository from virtual memory to secondary memory as requested by the system in accordance with the preferred embodiment.

FIG. 8 depicts a flowchart for storing a key repository from virtual memory to secondary memory as requested by the system in accordance with the preferred embodiment. This may be performed with a STORE (system) instruction 453. This is a separate process or thread from the user requested store described above with reference to FIG. 7, although it may be initiated by that process. This process may be initiated based on a number of user requests to add keys to memory, the length of time since the last system STORE, or other measures of periodicity or frequency as may be desired including upon a user booting up or turning off the data processing system. This periodicity may be set by a user, an administrator, a software developer, etc.

In a first step 800, update counter 435 may be write-locked to prevent any additional changes to the main or shadow key repositories in virtual memory 410 during this process. In step 810 the data in main key repository 430 or portions thereof may be encrypted and a hash created from the encrypted and unencrypted data. In step 820, the encrypted and hashed data may be stored to secondary memory 400 as main key repository 420. Main key repository 430 may be unmodified by this process. However, additional steps may be needed if the main key repository 430 was not updated with shadow key repository 431 in step 620 above. That is, the data of both shadow key repository 431 and main key repository 430 may need to be used to generate and store main key repository 420.

In step 830, shadow key repository 431 in virtual memory 410 may be emptied, flushed or otherwise cleared. In step 840, shadow key repository 421 may be emptied, flushed or otherwise cleared, preferably by storing empty shadow key repository 431 to the preexisting shadow key repository 421. In step 850, update counter 435 may be reset to 0 (zero). Finally, in step 860, the update counter 435 write lock may be released so other key repository updates may continue.

Figure 9:
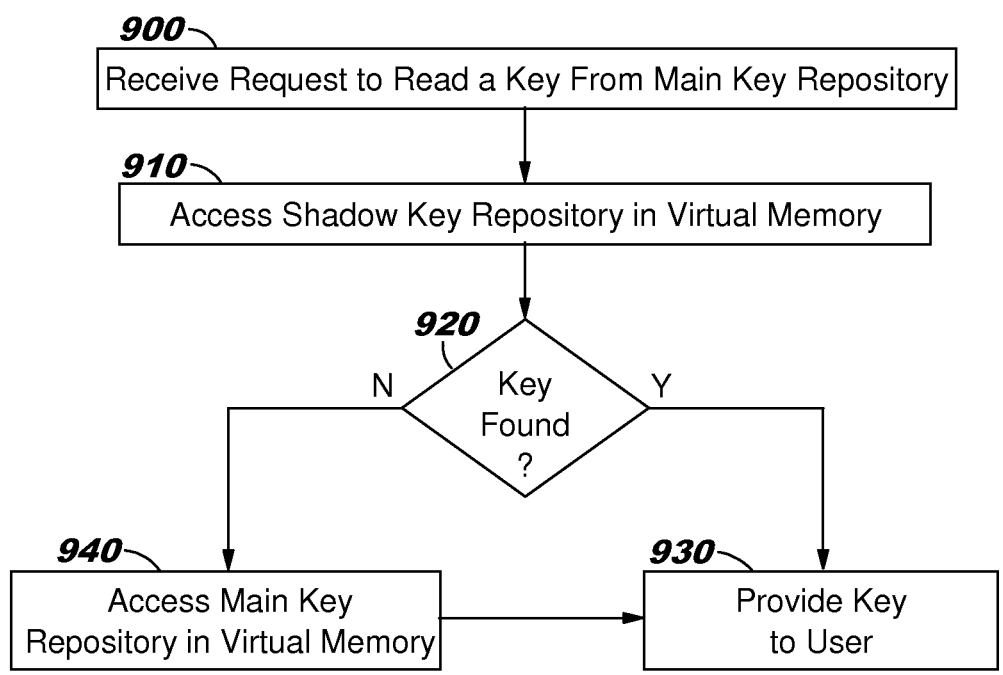
FIG. 9 depicts a flowchart for reading or getting a key from virtual memory as requested by a user in accordance with the preferred embodiment.

FIG. 9 depicts a flowchart for reading or getting a key from virtual memory as requested by a user in accordance with the preferred embodiment. This may be performed with a GET instruction 454. In a first step 900, the system may receive a request from the user (or other user approved source) to access a key from the main key repository. In step 910, shadow key repository 431 may be accessed to see if that key was recently added to that key repository. In step 920, if it is determined that the requested key was found in the shadow key repository, then processing continues to step 930, otherwise to step 940. In step 930, the key is then provided to the user. In step 940, if no key was found in the shadow key repository, then the main key repository is accessed to find the key. The requested key is then provided to the user in step 930.

Steps 910 and 920 may be optional if main key repository 830 contains all keys included in shadow key repository 931 as per step, 620 above. If not, then steps 910 and 920 may not be optional as not all keys may be in main key repository 930.

FIGS. 4-9 depict a preferred embodiment which may be implemented in a Java™ environment using keystores such as JCEKS although alternative environments and embodiments may be utilized as well. Advantages of using an implementation of the preferred embodiment using JCEKS keystores in a Java™ environment is that the implementation may be outside of a signed cryptographic provider, and thus will not force a service refresh of the provider and/or Java™ runtime environment (JRE). Furthermore, since the keystore APIs do not permit the implementation to know where the keystore is stored (the Java™ OutputStream object lacks such information), the preferred embodiment allows such knowledge and would put the shadow in the same directory as the main keystore, thus according the same protection to the shadow as to the main keystore from data-at-rest attacks.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing keys securely stored in a computer memory comprising:
   receiving by a processor a request to store a first key to a first key repository, located in non-volatile memory, the first key repository including a first main key repository for securely storing keys;
   utilizing the processor for storing the first key to a second key repository located in volatile memory in response to the request, the second key repository including a second main key repository for storing keys and a second shadow key repository for storing incremental updates to the second main key repository, wherein the first key is stored to the second shadow key repository; and
   utilizing the processor for securely storing the first key from the second key repository to the first key repository within said computer memory based on a predetermined periodicity;
   wherein the keys are used for cryptographic operations.

2. The method of claim 1 wherein securely storing the first key from the second key repository to the first key repository includes encrypting the first key and storing the encrypted first key to the first key repository.

3. The method of claim 2 further comprising a step of flushing the second key repository subsequent to storing the first key from the second key repository to the first key repository.

4. The method of claim 2 wherein securely storing the first key from the second key repository to the first key repository includes storing the first key from the second shadow key repository to a first shadow key repository located in the first key repository in non-volatile memory.

5. The method of claim 2 wherein securely storing the first key from the second key repository to the first key repository includes storing the first key from the second shadow key repository to the second main key repository and then securely storing the first key from the second main key repository to the first main key repository.

6. The method of claim 2 wherein the step of securely storing the first key from the second key repository to the first key repository includes storing the first key from the second shadow key repository to a first shadow key repository located in the first key repository.

7. The method of claim 2 wherein the step of storing the first key to the second shadow key repository includes storing the first key to the second main key repository, and wherein the step of securely storing the first key from the second key repository to the first key repository includes securely storing the first key from the second main key repository to the first main key repository.

8. The method of claim 1 further comprising receiving a request to store a second key to the first key repository and in response storing the second key to the second key repository, wherein said step of storing said first key from the second key repository to the first key repository based on a predetermined periodicity includes storing the second key from the second key repository to the first key repository.

9. The method of claim 8 further comprising a step of flushing the second key repository subsequent to storing the first key and the second key from the second key repository to the first key repository.

10. The method of claim 1 wherein the periodicity is based on a time period since a previous key was stored to the first key repository.

11. The method of claim 1 wherein the periodicity is based on a number of keys stored to the second key repository.

12. The method of claim 1 wherein the first key repository includes the first main key repository and a first shadow key repository stored in non-volatile memory, the first shadow key repository for storing incremental updates to the second shadow key repository.

\* \* \* \* \*